United States Patent [19]
MacLean

[11] Patent Number: 5,144,444
[45] Date of Patent: Sep. 1, 1992

[54] METHOD AND APPARATUS FOR IMPROVING THE OUTPUT RESPONSE OF AN ELECTRONIC IMAGING SYSTEM

[75] Inventor: Steven D. MacLean, Webster, N.Y.

[73] Assignee: Eastman Kodak Company, Rochester, N.Y.

[21] Appl. No.: 710,388

[22] Filed: Jun. 5, 1991

[51] Int. Cl.5 .............................................. H04N 5/30
[52] U.S. Cl. .............................. 358/209; 358/213.11; 358/213.15; 358/213.18; 358/213.26
[58] Field of Search ....................... 358/213.11, 213.13, 358/213.15, 213.18, 213.26, 213.27, 213.31, 209; 340/706, 709, 711, 721, 723

[56] References Cited

U.S. PATENT DOCUMENTS

| | | | |
|---|---|---|---|
| 4,644,403 | 2/1987 | Sakai et al. ........................... | 358/213 |
| 4,663,669 | 5/1987 | Kinoshita et al. .............. | 358/213.19 |
| 4,780,764 | 10/1988 | Kinoshita et al. .............. | 358/213.19 |
| 4,857,996 | 8/1989 | Hirano et al. ..................... | 358/48 |
| 4,953,028 | 8/1990 | Murayama et al. ............ | 358/213.31 |
| 5,019,912 | 5/1991 | Matsuda ........................ | 358/213.26 |

Primary Examiner—Michael Razavi
Assistant Examiner—Joseph V. Colaianni, Jr.
Attorney, Agent, or Firm—Parkhurst, Wendel & Rossi

[57] ABSTRACT

A method and apparatus for improving the output response of electronic imaging systems is provided in which horizontal clocking signals used to transfer charge from a horizontal shift register to an output amplifier are synchronized with a clamp clock signal and a sample clock signal. The clocking signals are generated so that the horizontal clocking signals are in the same state when the clamp clock signal and the sample clock signal are generated to eliminate cross talk caused by the horizontal clocking signals.

3 Claims, 4 Drawing Sheets

METHOD AND APPARATUS FOR IMPROVING THE OUTPUT RESPONSE OF AN ELECTRONIC IMAGING SYSTEM

FIELD OF THE INVENTION

The invention relates in general to electronic imaging systems The invention relates in particular to a method and apparatus for improving the output response including the dynamic range, linearity and signal-to-noise ratio, of an electronic imaging system.

BACKGROUND OF THE INVENTION

Solid state electronic imaging devices, such as charge coupled devices (CCD's) and the like, have been utilized in a wide variety of electronic imaging systems to generate electronic representations of an imaged scene. One common electronic image device structure, for example, is the full-frame CCD image sensor that typically includes a vertical CCD shift register containing a two dimensional array of photocapacitive sensing elements (pixels), which also serve as a photocharge transport mechanisms, a horizontal CCD output shift register formed on a silicon substrate, and an output amplifier coupled to the horizontal CCD shift register. An image is acquired by the image sensor when incident light, in the form of photons, falls on the array of pixels in the vertical CCD shift register and generates a proportional photocharge within the silicon substrate at each pixel site The photocharge is collected locally at each pixel site of the array in potential wells formed within the silicon substrate by the application of voltage or clock signals to clock lines of the vertical CCD shift register. Columns of collected photocharge are transported or shifted in parallel from the vertical CCD shift register row by row into the horizontal CCD shift register. Voltage signals are then applied to clock lines of the horizontal CCD shift register to transport or shift the rows of charge pixel by pixel from the horizontal CCD shift register to the output amplifier. The signal from the output amplifier is generally clamped and sampled at an appropriate pixel rate to generate an effective output signal that is subsequently supplied to signal processing circuitry.

Conventional electronic imaging systems, however, have been found to exhibit a non-linearity in their output response. It is an object of the invention to eliminate, or substantially reduce, this non-linearity to improve the overall output response of such systems.

SUMMARY OF THE INVENTION

The invention provides a method and apparatus for improving the output response of electronic imaging systems. Specifically, horizontal clocking signals used to transfer charge from a horizontal shift register to an output amplifier of an electronic imaging system are synchronized with a clamp clock signal and a sample clock signal, respectively supplied to a clamp circuit and a sampling circuit, to prevent cross talk caused by the horizontal clocking signals during the sampling operation. The horizontal clocking signals are generated so that they are in the same state when the clamp clock signal and the sample clock signal are generated.

BRIEF DESCRIPTION OF THE DRAWINGS

With the above as background, reference should now be made to the following detailed description of the preferred embodiment of the invention and the accompanying drawings, in which.

DETAILED DESCRIPTION OF THE PREFERRED EMBODIMENTS

Figure 1:
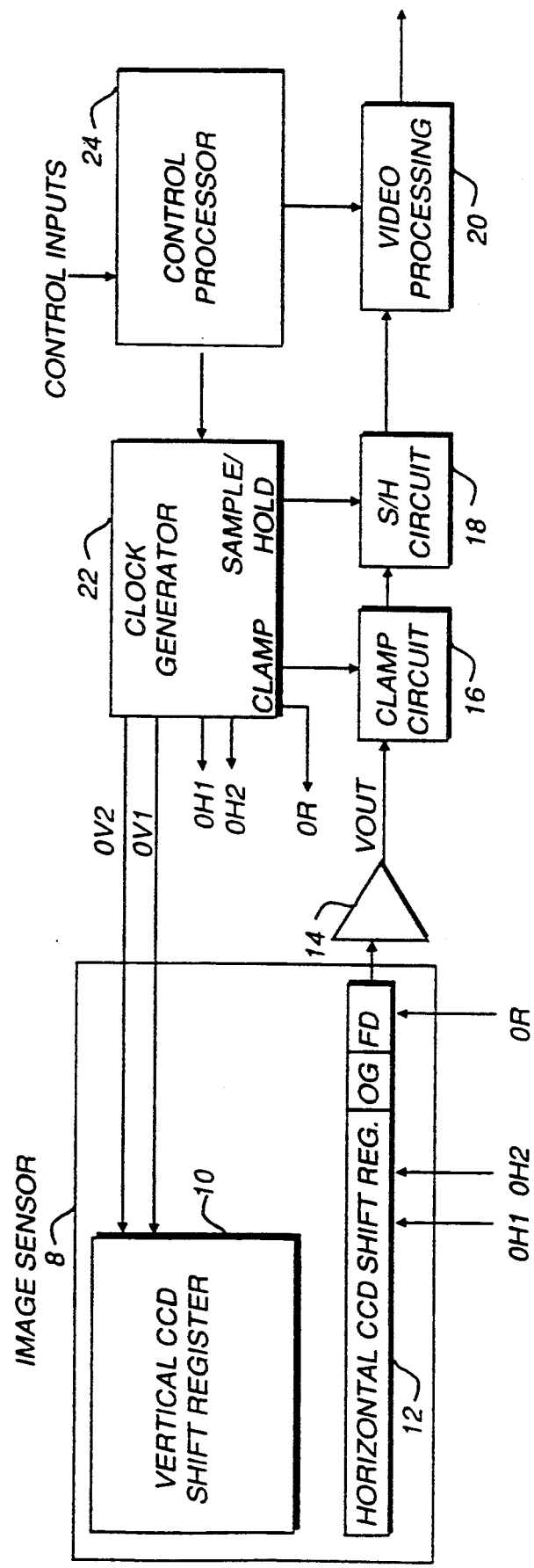
FIG. 1 is a schematic block diagram of a conventional solid-state imaging system including a CCD image sensing device.

A schematic block diagram of a conventional electronic imaging system incorporating a CCD full-frame image sensor is illustrated in FIG. 1. A KAF-1400 image sensor manufactured by the Eastman Kodak Company of Rochester, N.Y. is a typical example of a CCD full-frame image sensor that may be employed in the illustrated system. While the invention will be described with reference to a CCD full-frame image sensor, it will be understood that the invention is universally applicable to other types of electronic image sensing devices including interline devices.

The full-frame image sensor 8 includes a vertical CCD shift register 10 and a horizontal CCD shift register 12. The vertical CCD shift register 10 and the horizontal CCD shift register 12 structures are constructed using two level polysilicon and two state buried channel technology. The vertical CCD shift register 10 contains 6.8 $\mu m \times 6.8 \mu m$ photocapacitive sensing elements or pixels which are used to both store and transport photocharge. The pixels are arranged in a 1320 (Horizontal)$\times$1035 (Vertical) array in which an additional twenty columns and two rows (one each at the top and bottom) of light shielded pixels are added to provide a dark reference. The particular full-frame image sensor illustrated, unlike other types of full-frame image sensors, does not include a storage array or register between the vertical register and the horizontal register. The operation of the image sensor must therefore be synchronized with strobe illumination or a shutter operation must be utilized during readout periods. Typical applications for the such sensors include machine vision devices, film digitizers and electronic still photography devices.

The output from the horizontal CCD shift register 12 is supplied to an output amplifier 14. The output amplifier 14 in turn is coupled to a clamp circuit 16. The clamp circuit 16 is coupled to a sample and hold (S/H) circuit 18 having an output line that is coupled to video processing circuitry 20. A clock generator 22 is provided to supply the various clocking signals needed to operate the vertical and horizontal CCD shift registers 10 and 12, the clamp circuit 16, and the S/H circuit 18. A control processor 24 controls the overall operation of the electronic imaging system in response to control inputs including, for example, exposure initiation signals.

Figure 2:
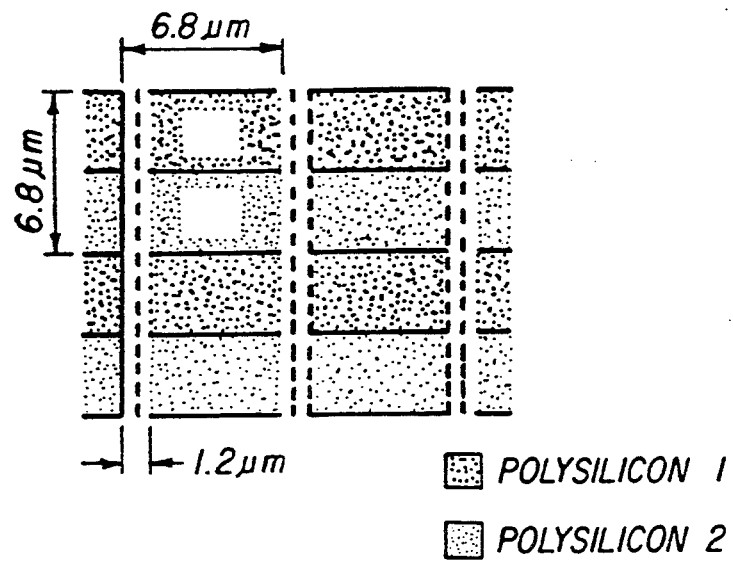
FIG. 2 is a diagram illustrating the arrangement of pixel sites and clocking electrodes in the CCD image sensing device illustrated in FIG. 1.

As was described above, an image is acquired when incident light falls on the array of pixels in the vertical CCD shift register 10 and creates photocharge, namely, electron-hole pairs or simply electrons, within the silicon substrate of the image sensor 8. The photocharge is collected in potential wells formed at each pixel site by the application of clock signals generated by the clock generator 22 on the vertical CCD register gate electrodes or clock lines $\phi V1$ and $\phi V2$ illustrated in FIG. 2. The amount of charge collected at each pixel site is linearly dependent on the incident light level and the exposure time.

The photocharge is transported from the vertical CCD shift register 10 to the output amplifier 14 in a two step process. Columns of charge are first shifted in parallel line by line into the horizontal CCD shift register 12. The $\phi V1$ and $\phi V2$ gate electrodes are utilized to perform the transfer operation. The horizontal CCD shift register 12 then shifts the lines or rows of charge serially pixel by pixel to the output amplifier 14 as horizontal clock signals $\phi H1$ and $\phi H2$ are applied to the horizontal gate electrodes $\phi H1$ and $\phi H2$ by the clock generator 22.

Figure 3:
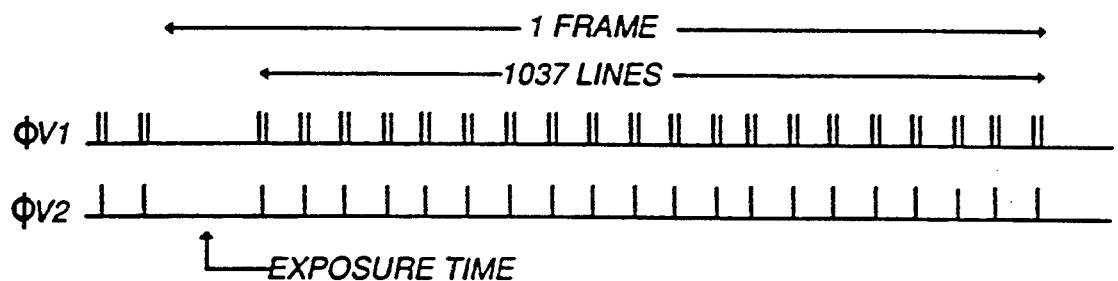
FIG. 3 frame timing diagram for the electronic imaging system illustrated in FIG. 1.
Figure 4:
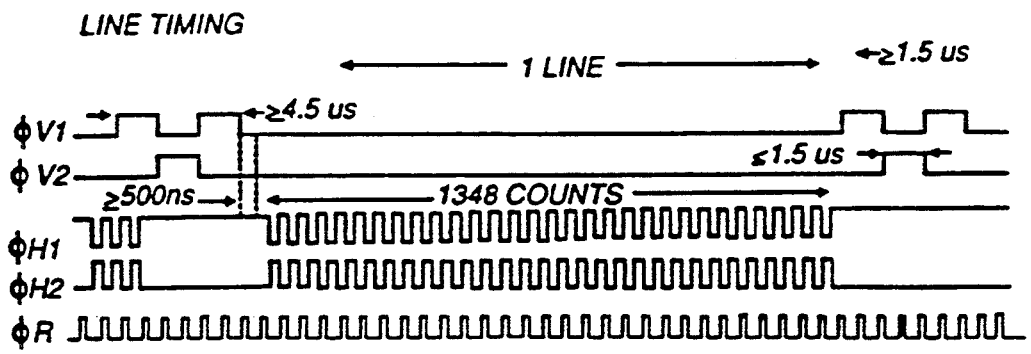
FIG. 4 is a line or row timing diagram for the electronic illustrated in FIG. 1.
Figure 5:
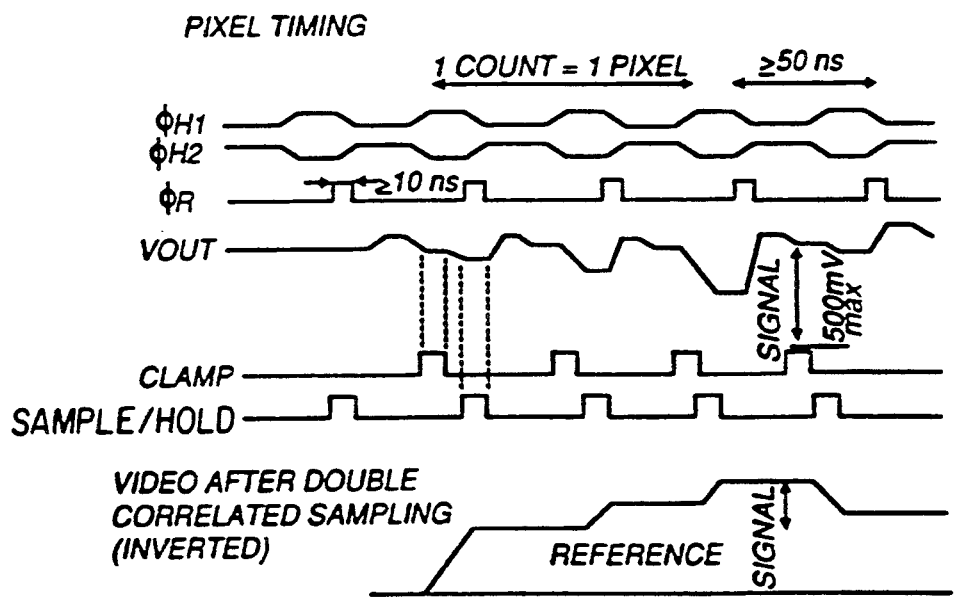
FIG. 5 is a pixel timing diagram for the electronic imaging system illustrated in FIG. 1.

A more detailed description of the transfer operation will be provided with reference to the timing diagrams illustrated in FIGS. 3-5. As shown in the timing diagrams, capture or integration of photocharge is performed when the $\phi V1$ and $\phi V2$ clock signals are held to a logic low level. A transfer operation to the horizontal CCD shift register 12 begins when the $\phi V1$ clock signal is brought to a logic high level which causes the charge accumulated under the $\phi V1$ and $\phi V2$ gate electrodes to combine under the $\phi V1$ gate electrode. The polarity of the $\phi V1$ and $\phi V2$ clocks are then reversed causing the photocharge to "spill" forward under the $\phi V2$ gate electrode of a subsequent pixel. The rising edge of the $\phi V2$ clock signal also transfers the first line of photocharge into the horizontal CCD shift register 12. A second phase transition places the photocharge under the $\phi V1$ gate electrode of the next pixel. The sequence is completed when the $\phi V1$ clock signal is brought to a logic low level while the horizontal CCD shift register 12 shifts out the first line of photocharge using the complementary clock signals $\phi H1$ and $\phi H2$. The clocking of the vertical CCD shift register in the above-described manner is referred to as accumulation mode clocking. The falling edge of the $\phi H2$ clock forces photocharge over an output gate (OG) of the horizontal CCD shift register 12 onto a floating diffusion node (FD) where it is sensed by the output amplifier 14 as shown in FIG. 1. The above-describe cycle repeats until all the lines of photocharge are transferred.

The potential of the floating diffusion node varies linearly with the quantity of photocharge applied thereto. The output amplifier 14 is used to buffer the change in floating gate potential to the clamp circuit 16. A reset clock signal $\phi R$ is used to remove the charge from the floating diffusion via a reset drain (not shown), which subsequently returns the floating diffusion potential to the reference level determined by a reset drain voltage supplied thereto. The voltage output Vout from the amplifier 14 is clamped and sampled by a clamp circuit 16 and the S/H circuit 18 in response to the CLAMP and SAMPLE clocks generated by the clock generator 22. The effective signal output is the difference in the output voltage Vout when clamped by the clamp circuit 18 and when sampled by the S/H circuit 18.

The above-described system has been found to generate non-linearities in the output signal. The source of this problem has been discovered to be related to the standard clocking sequence described above. More specifically, the problem is related to a cross-talk phenomenon occurring between the horizontal clock signals $\phi H1$ and $\phi H2$ and the output signal at the time of sampling. As can been seen in FIG. 5, the horizontal clock signals $\phi H1$ and $\phi H2$ change state between the period when the output voltage from the amplifier 14 is clamped to when the output voltage is sampled and are therefore not at the same voltage level when the clamp signal and the sample signal are generated. The change in state of the horizontal clock signals $\phi H1$ and $\phi H2$ at the time of clamping as opposed to the time of sampling appears to cause the cross-talk problem mentioned above.

Figure 6:
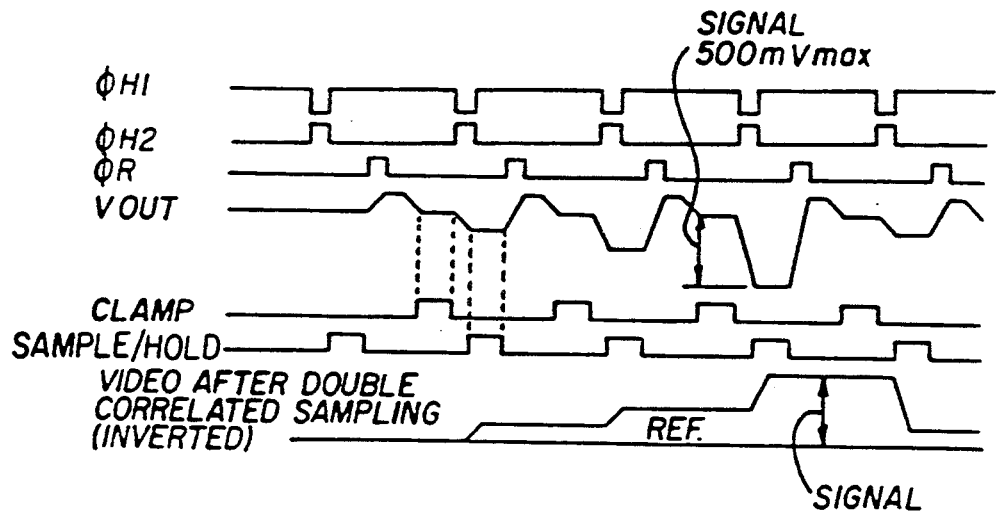
FIG. 6 is a pixel timing diagram for an electronic imaging system operating in accordance with the present invention.

Adjustment of the clocking sequence to insure that the horizontal clock signals $\phi H1$ and $\phi H2$ are at the same state when the clamp and sample signals are generated has been found to eliminate the cross-talk phenomenon. The preferred adjustment of the clocking sequence for the KAF-1400 sensor is illustrated in FIG. 6. The $\phi H1$ and $\phi H2$ clocks are in the same state, i.e. either a logic high or logic low level, when the clamp and sample clock signals are generated by the clock generator. This relatively simple adjustment to the image sensor timing has been found to eliminate the cross-talk problem. The elimination of the cross-talk substantially improves linearity as well as the dynamic range and signal to noise ratio of the system, thereby improving the overall response of the system. Comparison testing has shown that a system equipped with the KAF-1400 sensor and capable of reading densities from 0.3 ND to 1.8 ND prior to modification could read the distinct differences in density patches ranging from 0.3 ND to 2.4 ND after the clocking sequence was modified as shown in FIG. 6.

Figure 7:
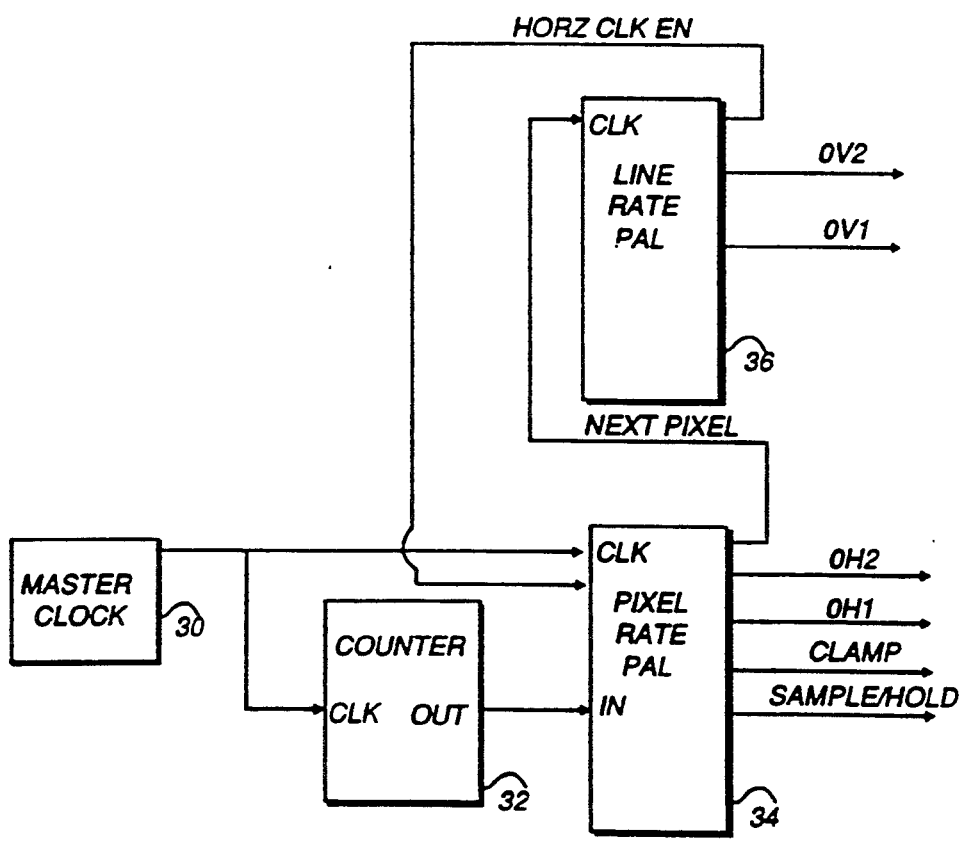
FIG. 7 is a schematic block diagram of a preferred clock generator in accordance with the present invention that is used to generated the clock signals illustrated in FIG. 6.

It should be noted that any type of timing generator can be used to produce the desired horizontal clocking signals. In a preferred embodiment of the clock generator shown in FIG. 7, programmable gate array devices are utilized to generate the desired clocking signals. A signal from a master clock 30 is supplied to a counter 32 and a pixel rate PAL 34. The pixel rate PAL 34 generates the horizontal clock signals $\phi H1$ and $\phi H2$, the sample clock signal SAMPLE, and the clamp clock signal CLAMP in response to a count signal supplied from the counter 32. One output (Next_Pixel) of the pixel rate PAL 34 is also used to clock a line rate PAL 36, which in turn, produces the vertical clock signals $\phi V1$ and $\phi V2$. One output of the line rate PAL 36 (Horz_Clk_En) is fed back to the input of the pixel rate PAL 34 to enable or disable the operation of the horizontal clocks $\phi H1$ and $\phi H2$ during vertical transfer periods.

The invention has been described with reference to certain preferred embodiments thereof. It will be understood, however, that variations and modifications can be made within the scope of the appended claims. For example, the specifics of the clocking scheme may vary as long as the horizontal clock signals are at the same state when the clamp and sample clocks are generated.

What is claimed is:

1. An electronic image system comprising:

a. a solid-state image sensor including an image receiving register and an output shift register, first transfer means for transferring image signals from the image receiving register to the output shift register in response to first clocking signals, and second transfer means for transferring image signals from the output shift register to an output signal line in response to second clocking signals;
b. an amplifier coupled to the output signal line;
c. a clamping circuit coupled to the amplifier that operates in response to a clamp clock signal;
d. a sample/hold circuit coupled to the clamping circuit that operates in response to a sample/hold clock signal;
a clock generator coupled to the image sensor, the clamping circuit, and the sample/hold circuit; the clock generator generating the first clocking signals, the second clocking signals, the clamp signal, and the sample/hold clock signal, wherein the second clocking signals are at the same state when the clamp clock signal and the sample/hold clock signal are generated so that cross talk normally caused by the second clocking signals is prevented.

2. An electronic image system comprising:
a. image sensing means including a vertical register comprising a plurality of pixels arranged in an array of rows and columns and a horizontal register coupled to the vertical register including a plurality of pixel charge storage sites corresponding to the number of pixels in the rows of the vertical register, wherein the vertical register includes parallel transfer means for transferring charge accumulated in the pixels row by row into the pixel charge storage sites of the horizontal register in response to vertical clocking signals and the horizontal register includes serial transfer means for serially transferring charge stored in the pixel charge storage sites to an output line in response to horizontal clocking signals;
b. amplification means coupled to the output line for amplifying charge transferred thereto and generated an amplified output signal;
c. clamping means for clamping the amplified output signal in response to a clamp clock signal;
d. sampling means including a sample/hold circuit for sampling the amplified output signal in response to a sample/hold clock signal;
clock generator means for generating the vertical clocking signals, the horizontal clocking signals, the clamp clock signal, and the sample/hold clock signal, wherein the horizontal clocking signals are in the same state when the clamp clock signal and the sample/hold clock signal are generated so that cross talk normally caused by the horizontal clocking signals is prevented.

3. A process of improving the output response of an electronic imaging system comprising the steps of:
a. exposing an electronic sensor including a vertical transfer register and a horizontal transfer register to incident light to generate photocharge;
b. generating and supplying vertical clocking signals and horizontal clocking signals to the vertical transfer register and the horizontal transfer register to transfer the photocharge from the electronic sensor to an output amplifier;
c. generating a clamp clock signal and a sample clock signal;
d. clamping a voltage output signal generated by the output amplifier in response to a clamp clock signal; and
sampling the voltage signal generated by the output amplifier in response with a sample/hold circuit that is responsive to a sample/hold clock signal;
wherein the horizontal clocking signals are in the same state when the clamp clock signal and the sample/hold clock signal are generated so that cross talk normally caused by the horizontal clocking signals is prevented.

* * * * *